US006310324B1

(12) United States Patent
Ward et al.

(10) Patent No.: US 6,310,324 B1
(45) Date of Patent: Oct. 30, 2001

(54) TUBE HEATING APPARATUS

(75) Inventors: Terry A. Ward, Richmond; Roger D. Gillespie, Memphis; Ronald A. Singer, Warren, all of MI (US)

(73) Assignee: Wartrom Machine Systems Incorporated, Clinton Twp., MI (US)

( * ) Notice: Subject to any disclaimer, the term of this patent is extended or adjusted under 35 U.S.C. 154(b) by 0 days.

(21) Appl. No.: 09/663,609

(22) Filed: Sep. 18, 2000

(51) Int. Cl.[7] .......... A21B 1/00
(52) U.S. Cl. .......... 219/400; 432/124; 432/141; 219/388; 219/389
(58) Field of Search .......... 219/400, 388, 219/389, 521; 432/124, 141, 142, 230, 239, 242; 34/108, 109

(56) References Cited

U.S. PATENT DOCUMENTS

| | | | | |
|---|---|---|---|---|
| 3,214,566 | * | 10/1965 | Wilson | 219/400 |
| 3,502,020 | * | 3/1970 | Bressickello | 219/400 |
| 3,577,650 | * | 5/1971 | Brahm | 219/400 |
| 3,887,327 | * | 6/1975 | Weber et al. | 432/124 |
| 5,134,927 | * | 8/1992 | McCarthy, III et al. | 219/400 |
| 5,148,737 | * | 9/1992 | Poulson | 219/400 |
| 5,339,726 | * | 8/1994 | Poulson | 219/400 |
| 5,361,686 | * | 11/1994 | Koopman | 219/400 |
| 5,393,039 | * | 2/1995 | Smith | 432/141 |
| 5,451,744 | * | 9/1995 | Koopman et al. | 219/400 |
| 5,599,471 | * | 2/1997 | Zaidman | 219/400 |
| 6,000,938 | * | 12/1999 | Melanowicz | 432/242 |
| 6,097,002 | * | 8/2000 | Huguet | 219/400 |
| 6,116,897 | * | 9/2000 | Ketteringham | 432/141 |
| 6,119,584 | * | 9/2000 | Hsu | 219/400 |

* cited by examiner

*Primary Examiner*—Teresa Walberg
*Assistant Examiner*—Fadi H. Dahbour
(74) *Attorney, Agent, or Firm*—Harness, Dickey & Pierce, P.L.C.

(57) ABSTRACT

An apparatus for rapidly heating a plurality of parts to a desired temperature. The apparatus includes an oven within which is disposed a rotationally supported magazine for holding a plurality of parts to be heated. A plurality of heating elements and an air circulation system for circulating heated air are also disposed within the oven. A controller is operatively coupled to the magazine for controlling rotation of the magazine to enable parts to be loaded into, and unloaded from, the magazine through an input/output station. A user actuatable switch, such as a foot pedal operated switch, is operatively coupled to the controller to allow a user to send control signals to the controller during loading and unloading of parts to control rotation of the magazine such that the parts are presented at the input/output station for removal and/or loading. The air circulation system significantly reduces the time needed to heat the parts to a given temperature, thus reducing the operating cost of the oven.

18 Claims, 10 Drawing Sheets

TUBE HEATING APPARATUS

BACKGROUND OF THE INVENTION

1. Field of the Invention

The present invention relates generally to ovens, and more particularly to an oven with a rotatable, part supporting magazine for precisely heating a plurality of similar objects, such as lengths of tubing, to a desired temperature and for a desired amount of time.

2. Description of Related Art

The heating of parts to a desired temperature is necessary in many industries. Heating to a particular temperature is important in many instances, for example, when heating plastic parts or components to a desired temperature so that they may be subsequently formed into a variety of configurations. For example, in the automotive industry a variety of plastic parts or components are required for the manufacture of motor vehicles. One example of such parts are plastic tubes for use as fuel lines in motor vehicles. The manufacture of complexly shaped plastic tubing requires heating the tubes to a relatively precise temperature so that the tubes can be shaped into different configurations. The tubes are typically heated in ovens. Traditional ovens, however, are not very efficient, and control of the temperature and the amount of time during which a part is heated is often difficult to maintain because of the physical construction and controls associated with the ovens.

Traditional ovens which rely on radiant heating from one or more fixed heating elements also are not especially efficient, from an energy usage standpoint, because relatively long time intervals are often required to heat parts to the desired temperature before removal. An oven which operates to actively blow or circulate heated air over the parts held therein would significantly reduce the time needed to heat the parts to a given temperature. This would also increase the energy efficiency of the oven because parts would be heated to a given temperature in a lesser period of time, thus reducing the amount of power consumed by the oven to process a given number of parts in a given period of time.

Traditional ovens are also typically not easily moved from one location to another within a work area, such as a factory. For convenience and utility, it would be highly desirable to be able to move the oven as needed within a work environment.

It is therefore a principal object of the present invention to provide an oven which more rapidly heats parts to a desired temperature than previously developed ovens, and with greater energy efficiency.

It is another object of the present invention to provide an oven suitable for heating a large plurality of lengths of plastic tubing, and for allowing each length of tubing to be ejected from the oven, one at a time, as soon as same has been within the oven for a predetermined period of time.

It is still another object of the present invention to provide an oven that is more compact than previously developed ovens used for heating pluralities of parts, and which is capable of being easily moved, if necessary, within a work environment such as a factory area.

SUMMARY OF THE INVENTION

The above and other objects are provided by a heating apparatus in accordance with a preferred embodiment of the present invention. The apparatus includes an oven having a housing. Within the housing is disposed a magazine for receiving and independently supporting a plurality of independent parts, such as, for example, lengths of tubing. The magazine is disposed for rotational movement within the housing. Also disposed within the housing is a heat circulating assembly for heating the parts being supported by the magazine. Parts are heated by forcibly circulating heated air within the housing of the oven over part supporting elements of the magazine that contain the parts being heated. The housing includes a user controlled door which allows parts to be sequentially loaded into the rack and sequentially removed once each part reaches a predetermined temperature. An ejection apparatus is used to partially eject parts from the magazine, in sequential fashion, once the parts have reached a predetermined temperature.

A controller monitors the time that each part spends within the oven being heated. The controller also controls operation of an actuator assembly which is used to rotate the magazine during part loading and ejecting cycles. The controller also controls the ejection apparatus via signals supplied by a user actuatable control, which in one preferred form comprises a foot pedal operated switch.

The apparatus of the present invention thus forms an effective means heating a large plurality of parts in such a manner that a heat soak time for each of the parts is monitored, and such that each part spends a user selected amount of time within the oven before being removed.

A principal advantage of the present invention is that the forced circulation of heated air around the part supporting elements of the magazine significantly reduces the time needed to heat the parts to the desired temperature. This also reduces the power required to operate the apparatus during a given workshift.

The apparatus of the present invention also provides efficient temperature controlled heating. The apparatus of the present invention further requires minimal user sophistication because an electronic control system guides the user and provides real time status information about the apparatus and the loaded parts in the oven.

BRIEF DESCRIPTION OF THE DRAWINGS

The various advantages of the present invention will become apparent to one skilled in the art by reading the following specification and subjoined claims and by referencing the drawings in which:

FIG. 9 is a view of the "Timer Setting" screen displayed by the controller;

DETAILED DESCRIPTION OF THE PREFERRED EMBODIMENTS

Figure 1:
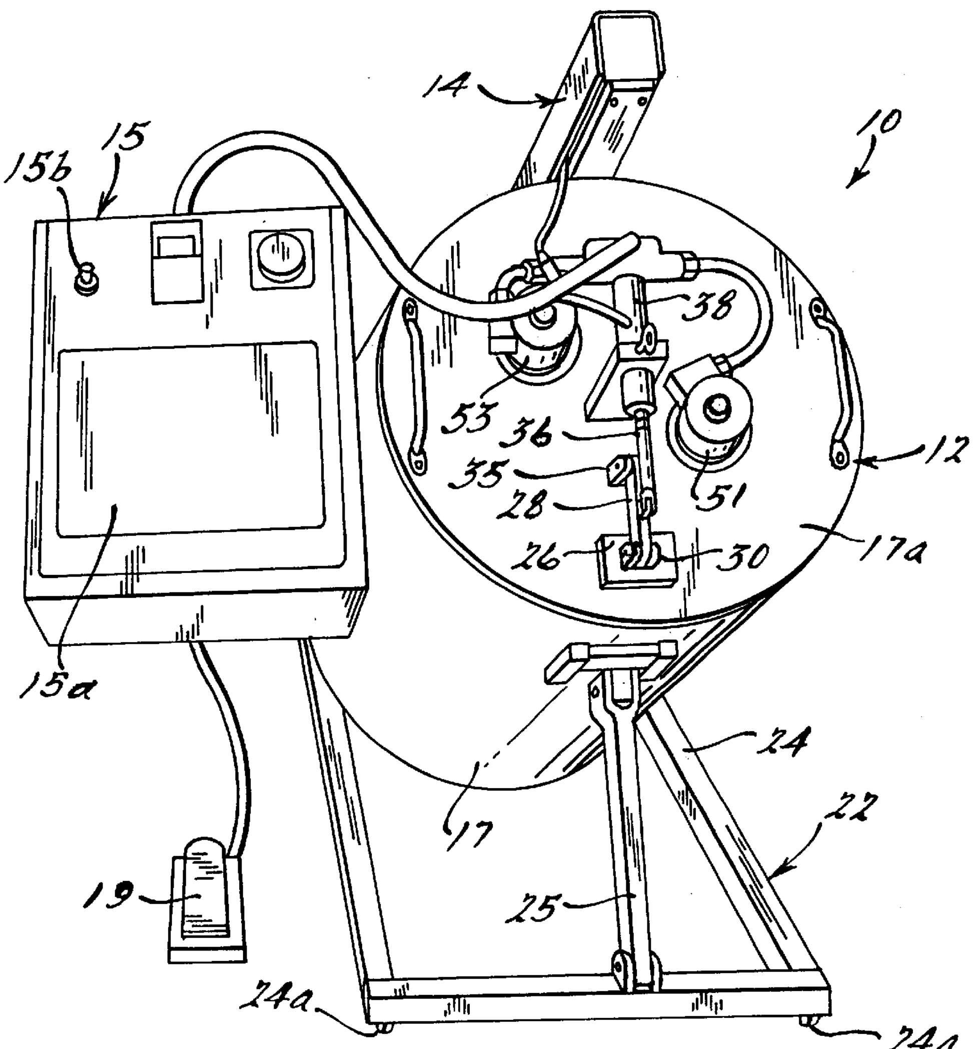
FIG. 1 is a perspective view of an apparatus in accordance with a preferred embodiment of the present invention.
Figure 4:
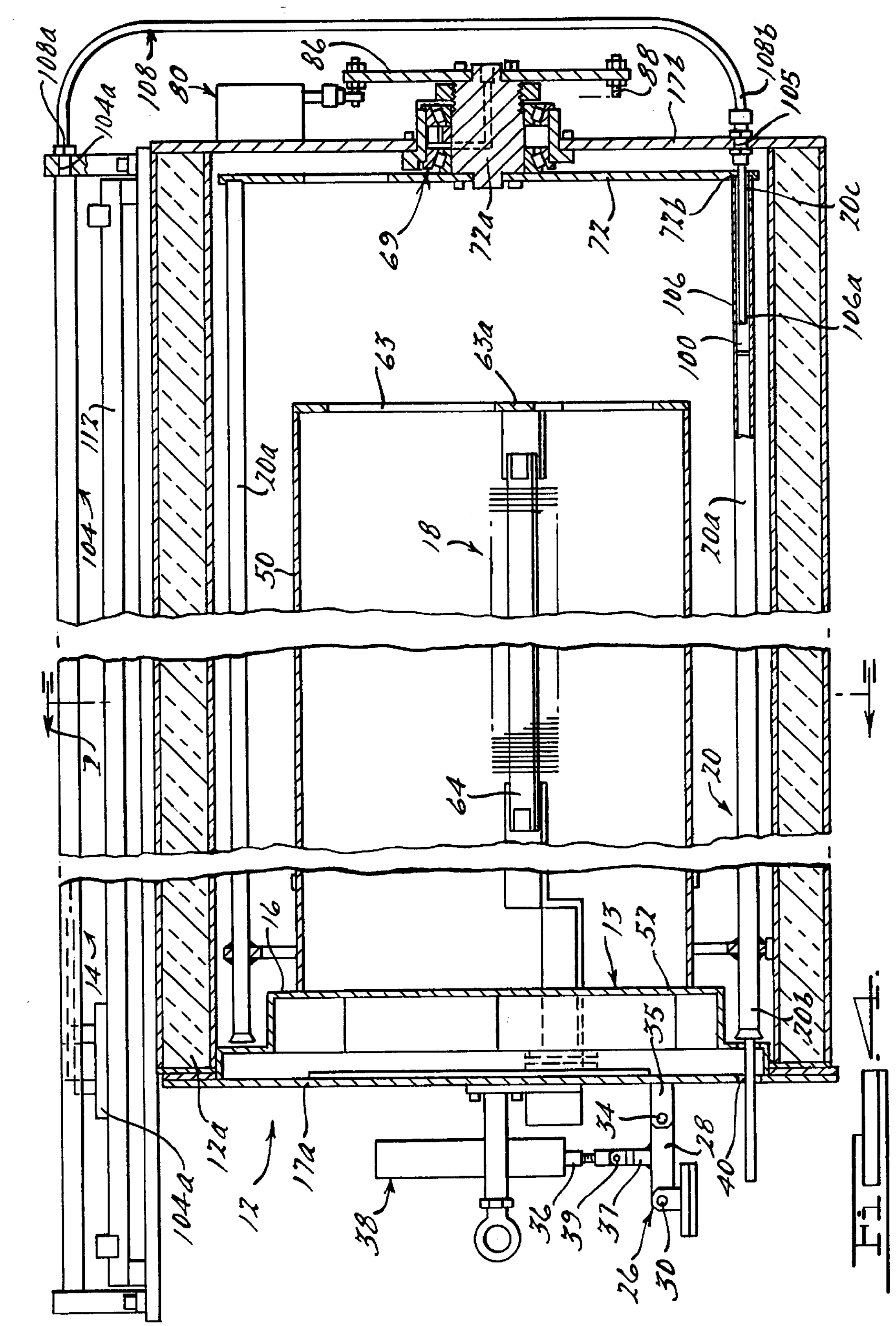
FIG. 4 is a side cross-sectional view of the oven of FIG. 2 taken along section line 4—4 in FIG. 2.

FIGS. 1 and 4 show a heating apparatus 10 in accordance with a preferred embodiment of the present invention. The heating apparatus 10 generally comprises an oven 12, a part ejector system 14 operably associated with the oven 12, and a programmable logic controller 15. The controller includes an on/off power switch 15*b* for powering the apparatus on and off. A user operated foot pedal 19 is in communication with the controller 15 for assisting in part loading and unloading operations. Objects or parts, such as for example plastic tubes that are required to be heated, are placed within the oven 12. The apparatus 10 heats the parts for a predetermined time so that the parts become sufficiently pliable so that they can be removed from the oven 12 and formed into desired configurations. The controller 15 tracks the position and the interval of time which each part spends within the oven 12. The ejector system 14 ejects parts that have spent the desired amount of time in the oven 12, and which are therefore ready for removal from the oven 12.

Referring specifically to FIGS. 1 and 4, the oven 12 has a cylindrical housing 17 within which is disposed a heat circulating system 13 and a magazine 20. The heat circulating system 13 is comprised of an air circulating system 16 and a heating system 18. The inner surface of the housing 17 is preferably covered with an insulating material 12*a*. One preferred insulating material is blanket-type insulation material having an R9 insulating value. In the preferred embodiment, the housing 17 is supported by a frame 22 that includes a base 24 and a frame arm 25. In the preferred embodiment, the frame arm 25 supports the housing 17 at an angled position relative to the floor on which the apparatus 10 rests for added convenience in loading and unloading parts from the oven 12. The base 24 may also include casters 24*a* to allow the apparatus 10 to be easily moved to different work areas within a workshop or factory.

Figure 2:
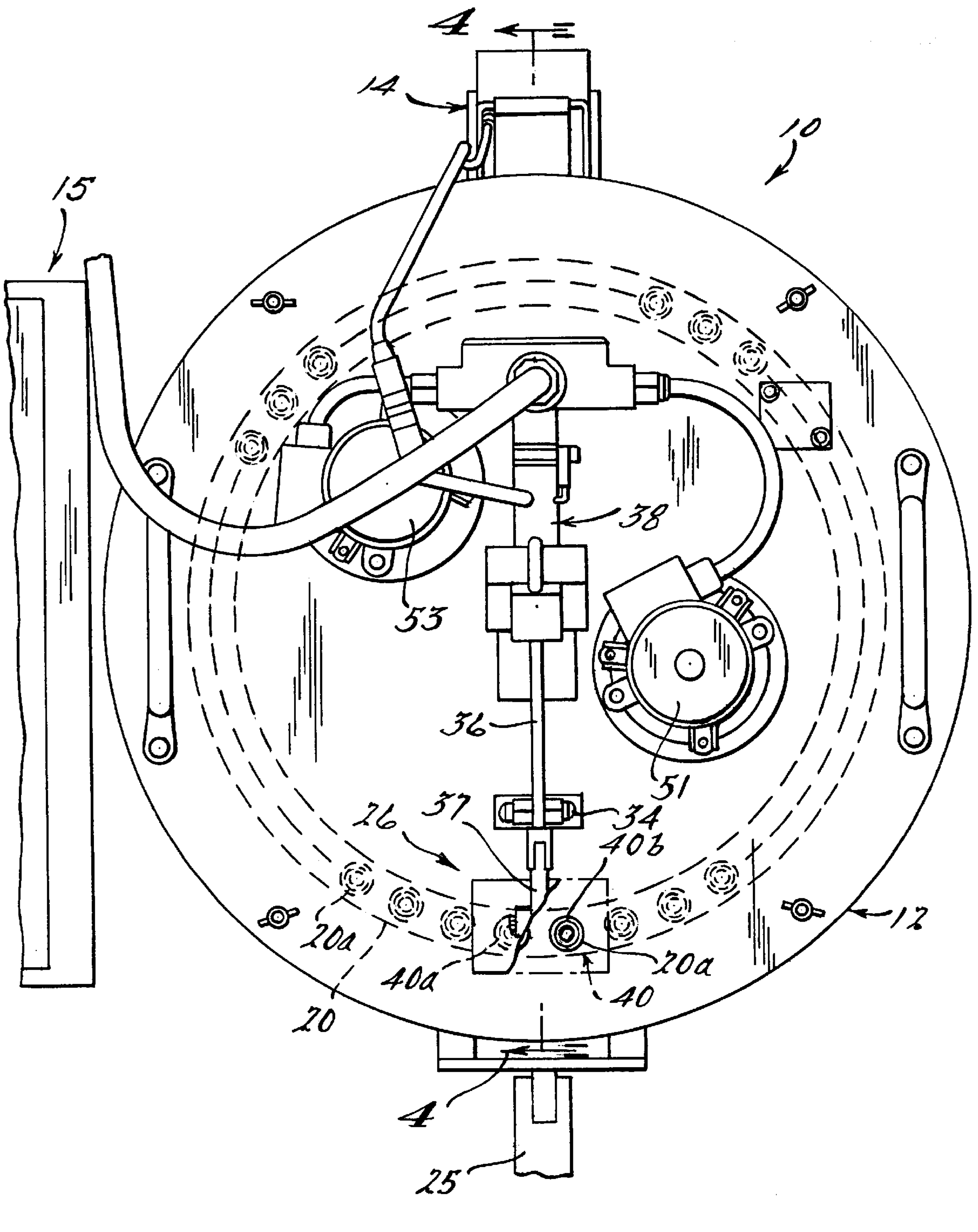
FIG. 2 is a front view of the oven portion of the apparatus of FIG. 1.

With reference to FIGS. 1, 2 and 4, the housing 17 includes a door 26 mounted on a front panel 17*a* of the housing 17. The door 26 provides access to an input/output station 40. The door 26 is pivotably coupled at point 30 to a support link 28 which is in turn pivotably coupled at point 34 to a support bracket 35. An actuator rod 36 of an actuator 38 is pivotably coupled at point 39 to an upstanding portion 37 of the support link 28. By this arrangement the actuator 38 is able to lift and lower the door 26. The input/output station 40 has an input station 40*a* and an output station 40*b* which forms an opening in the front panel 17*a* which is sized and shaped to provide access to a pair of part supporting elements 20*a* of the magazine 20 when the door 26 is opened. The input/output station 40 allows limited access to the part supporting elements 20*a* and escape of the heated air within the oven when removing parts, and thereby helps to alleviate temperature losses that would otherwise occur every time the door 26 is opened.

Referring to FIGS. 1, 2, 4, 5 and 7, the air circulating system 16 includes a tubular member 50 which is supported from a manifold 52 disposed on the front panel 17*a* of the housing 17. The tubular member 50 is preferably cylindrically shaped and extends along a major portion of the length of the housing 17 to a point near a rear wall 17*b* of the housing 17. The tubular member 50 circumscribes the manifold 52 and is sized and shaped to form a substantially circular shape which fits within the magazine 20.

The manifold 52 includes a pair of outlets 61*a* and 61*b* (FIG. 7) which are directed tangentially away from each other, and which are each in airflow communication with the interior area defined by the tubular member 50. The outlets 61*a*, 61*b* allow heated air drawn up through the air tubular member 50 to be expelled therethrough. Circulation fans 51*a* and 53*a* driven by a corresponding pair of motors 51, 53 (FIG. 1) are also mounted within the manifold 52. The fans operate to draw heated air up through the tubular member 50 and to exhaust the heated air through the outlets 61*a*, 61*b*. This ensures a very uniform temperature of the air circulating within the oven 12. The positions of the outlets 61*a*, 61*b* also facilitate a vortex motion of the heated air drawn up through the tubular member 50 such that a swirling airflow is created around each part supporting element 20*a* of the magazine 20. This swirling flow of heated air promotes much more rapid heating of the parts held within the elements 20*a* and ensures even heating of the parts along their entire lengths.

It is a principal advantage of the present invention that the heat circulating system 19 operates to recirculate and blow heated air over the support elements 20*a* during heating of the parts held therein. This serves to significantly reduce the time needed to heat the parts, as compared with conventional ovens which rely only on fixedly disposed heating elements which give off radiant heat but with no forced circulation of the heated air. Reducing the time required to sufficiently heat the parts thus serves to also reduce the energy required to operate the oven for a given workshift period. The rotational movement of the magazine 20 also serves to help more evenly heat the parts held within the support elements 20*a*.

Figure 5:
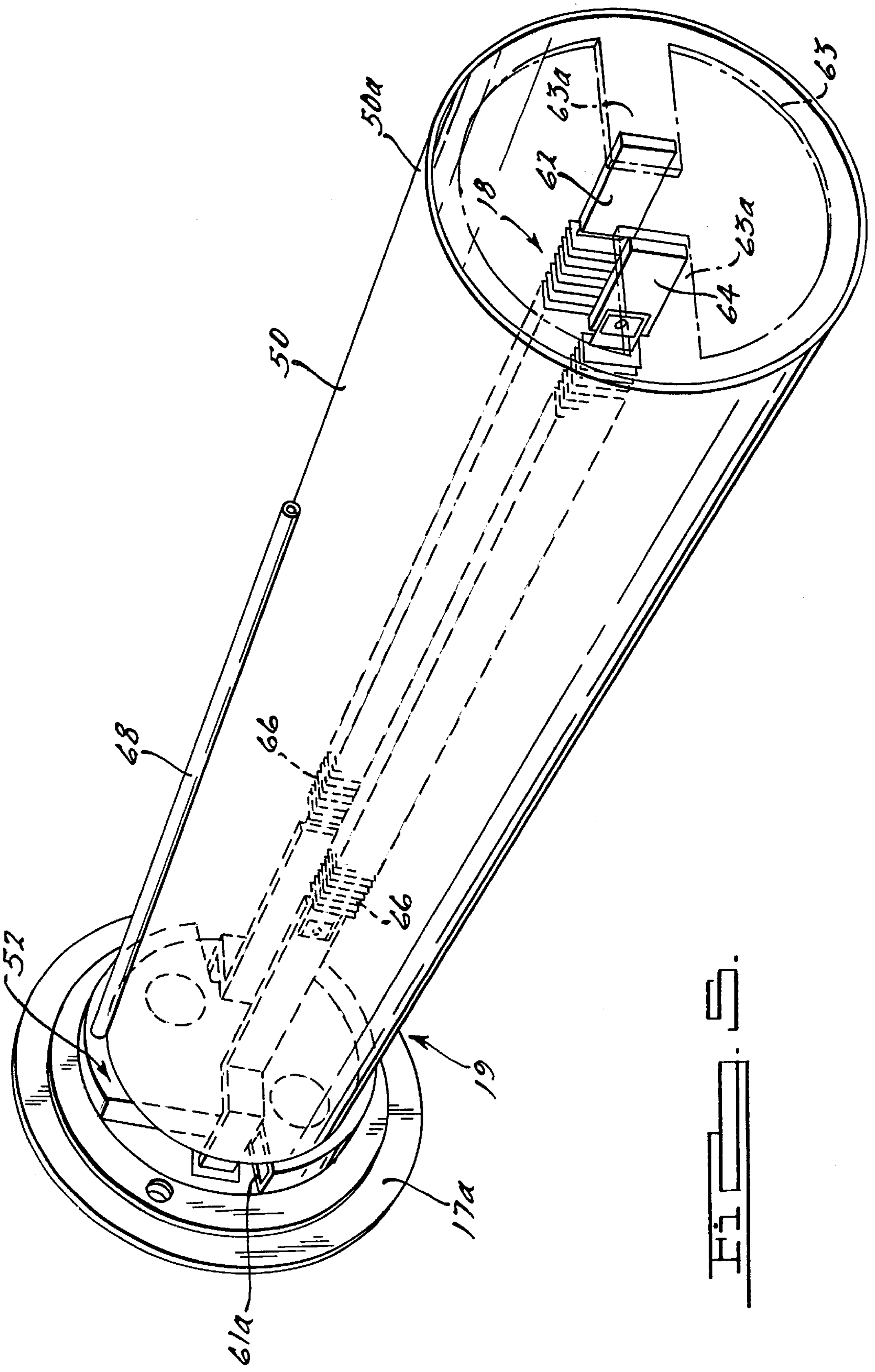
FIG. 5 is a perspective view of the heat circulating system of the oven with the end support ring shown in phantom.
Figure 7:
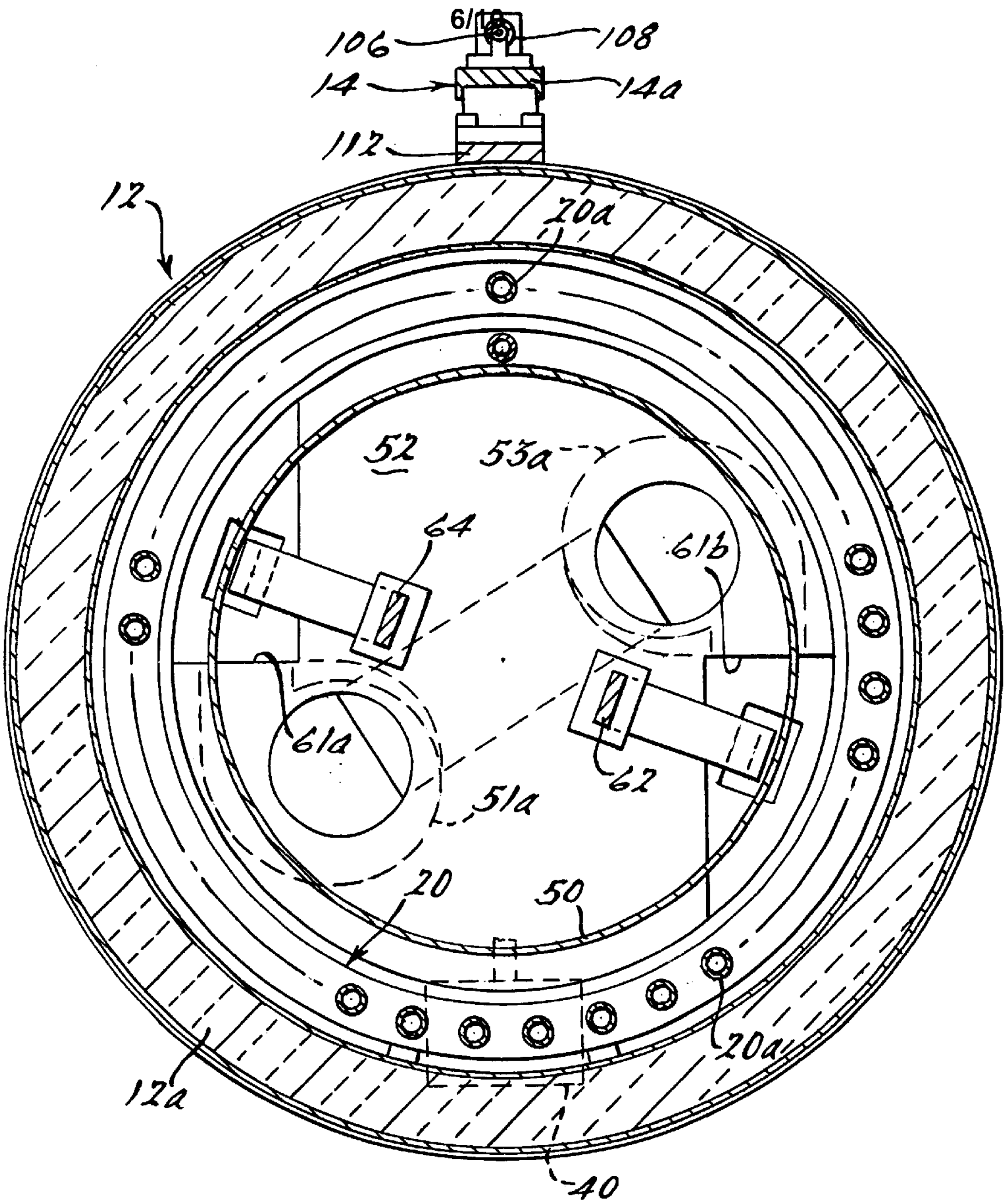
FIG. 7 is a cross-sectional view of the oven taken along section line 7—7 in FIG. 4.
Figure 7:
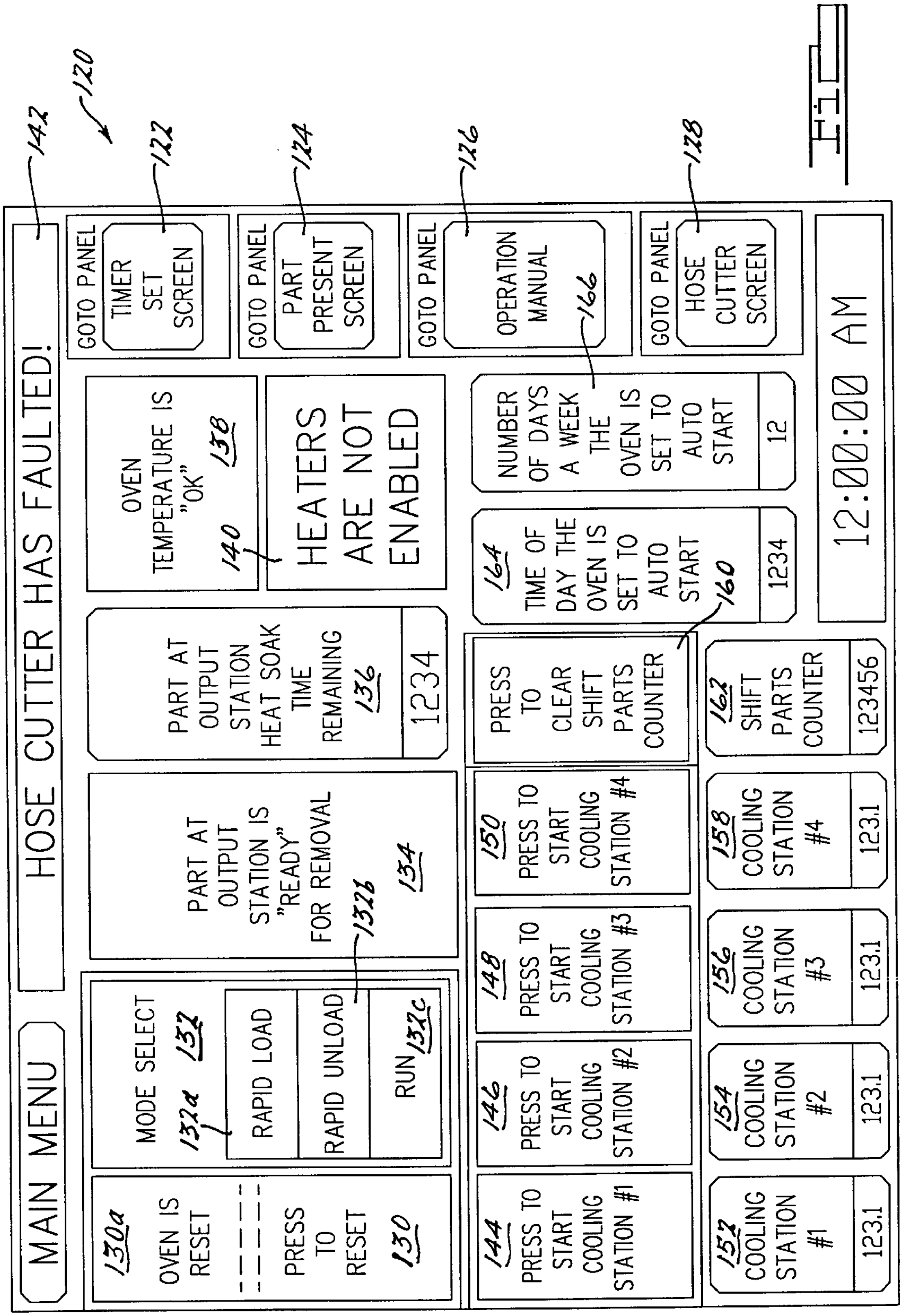

With a continued reference to FIGS. 4 and 5, the heating system 18 includes a pair of heating elements 62, 64 which are each supported at one end thereof from the front panel 17*a* of the housing 17, and at an opposite end by attachment via threaded fasteners to arms 63*a* of an end support ring 63. The end support ring 63 is in turn secured to the bottom end 50*a* of the tubular member 50 by welding or any other suitable attachment means. The heating elements 62, 64 are electrically conductive elements and are disposed within the interior area of the magazine 20. Fins 66 of each heating element 62, 64 provide a greater surface area to radiate heat and facilitate conductive heat transfer which is well known in the art. In the preferred embodiment, a temperature probe 68 is also supported from the manifold 52 to extend within the magazine 20 to obtain an accurate temperature reading. The output of the temperature probe 68 is coupled to the control system 15 so that the user can be informed of the temperature within the oven 12.

Figure 6:
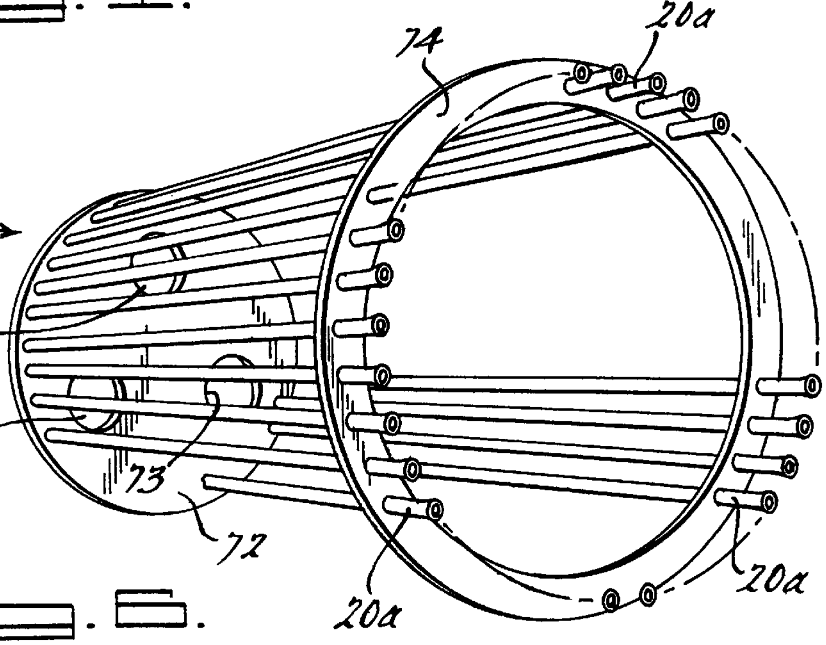
FIG. 6 is a perspective view of the rotating magazine of the oven.

With reference to FIG. 6, the rotating magazine 20 is shown in greater detail. The magazine 20 includes an end plate 72 and a frame ring 74. The tubular part supporting elements 20*a* are fixably coupled between the end plate 72 and the frame ring 74 such that each part supporting element 20*a* is fixably supported at its ends by the first end plate 72 and the frame ring 74. The part supporting elements 20*a* are positioned parallel to each other relative to their length and adjacent each other in a circular arrangement. In the preferred embodiment, 36 part supporting elements 20*a* are incorporated. However, it will be appreciated that a greater or lesser plurality of part supporting elements 20*a* could be incorporated, provided of course the internal area of the oven 12 is of suitable dimensions to accommodate the magazine 20.

At any given time, a pair of the part supporting elements 20*a* will be aligned with the input/output station 40. Thus, whenever the door 26 is opened, one part can be ejected from one of the exposed elements 20*a*, and/or one part can be loaded into one of the exposed elements 20*a*. The end plate 72 preferably has a plurality of holes 73 for reducing the weight of the magazine 20.

Referring to FIG. 4, the magazine 20 is rotatably supported within the housing 17 at an upper end 20*b* by a circumferential support block 17*c*, and at a lower end 20*c* by a bearing assembly 69. This allows the magazine 20 to be rotated 360 degrees within the housing 17. This rotation thus allows each of the part supporting elements 20*a* to pass the input/output station 40 to allow one part located within one support element 20*a* to be removed and another part to be loaded therein without disturbing the heating of the parts within the other support elements 20*a*. In this manner, the other parts are maintained within the oven 12 until heated to a desired temperature.

Figure 3:
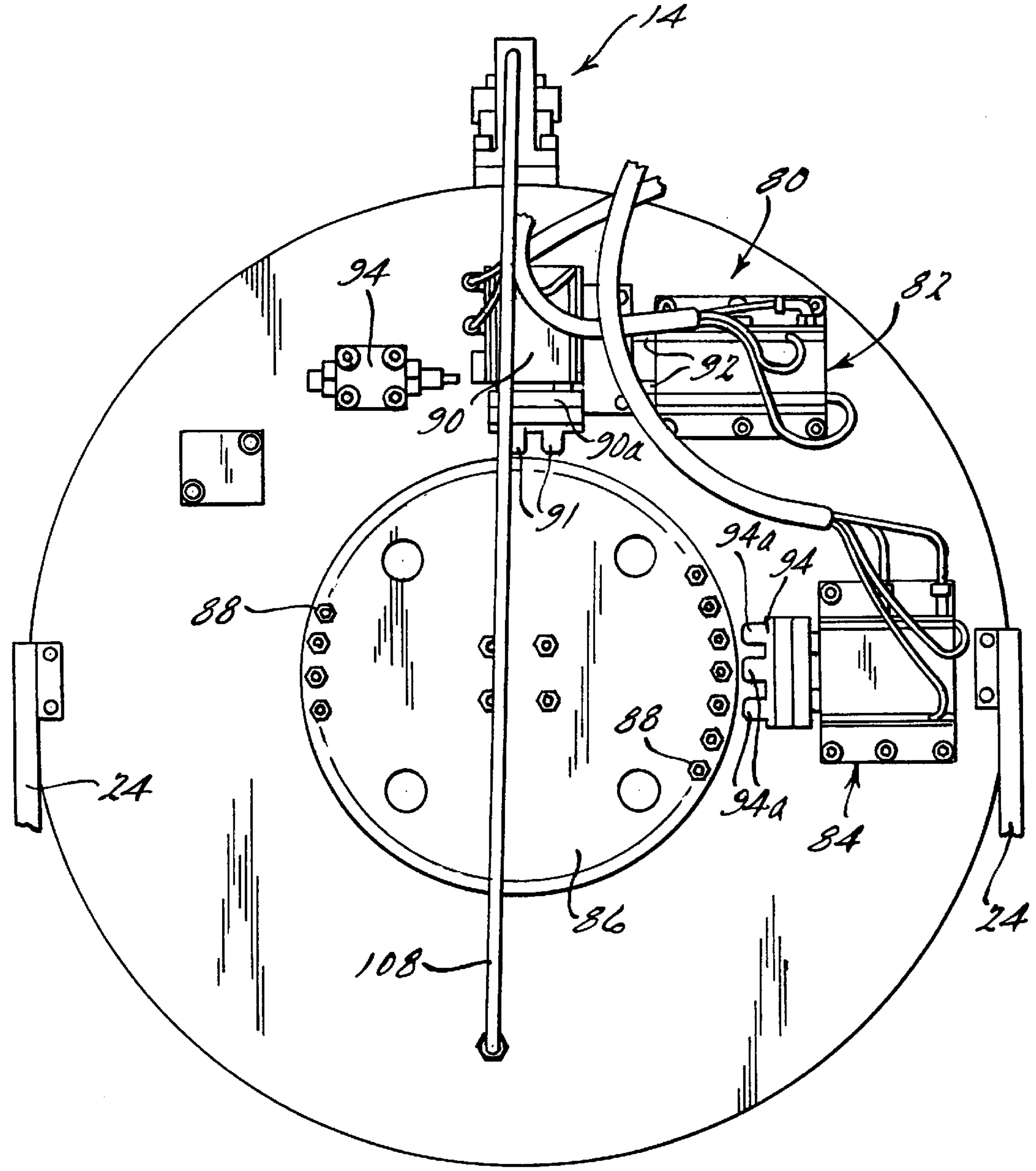
FIG. 3 is a rear view of the oven.

Referring further to FIGS. 3 and 4, a drive system 80 is shown for rotating the magazine 20. The drive system 80 includes a drive actuator assembly 82, a lock actuator 84, and a driven plate 86. The driven plate 86 is a circular shaped plate which is coupled to end plate 72 via a coupling element 72*a* (FIG. 4) and supported for rotational movement by bearing assembly 69. The driven plate 86 has a plurality of studs 88 secured about its perimeter in a circumferential arrangement.

The drive actuator assembly 82 includes a stud engaging actuator 90 and a position sensor 94 fixably connected to the rear wall 17*b* of the oven 12. The stud engaging actuator 90 is supported on an actuator arm 92 that moves the stud engaging actuator 90 linearly towards and away from a position sensor 94 mounted on the rear wall 17*b*, which is in communication with the controller 15. The stud engaging actuator 90 has an arm assembly 90*a* with a pair of posts 91 forming a gap therebetween.

In operation, energizing the drive actuator assembly 80 causes the actuator arm 92 to extend to the left in the drawing of FIG. 3. This causes the stud engaging actuator 90 to be shifted to the left until it contacts the position sensor 94. A signal from the position sensor 94 communicated to the controller 15 informs the controller 15 to stop the drive actuator assembly 82 from extending its actuator arm 92. The controller 15 then sends a signal to stud engaging actuator 90 which causes it to extend its actuator arm 90*a* downwardly in the drawings of FIG. 3 such that the posts 91 engage with one of the studs 88. A signal from the controller 15 then causes the actuator assembly 80 to retract its arm 92, thus causing the posts 91 to be urged to the right, and thus causing a controlled degree of rotation of the driven plate 86. The driven plate 86 causes a corresponding degree of rotational movement of the magazine 20 (clockwise in the drawing of FIG. 3). The stud engaging actuator 90 is then caused to retract via a signal from the controller 15.

Referring further to FIG. 3, the locking actuator 84 is incorporated for locking the driven plate 86, and thus the magazine 20, against unwanted rotational movement. When the drive actuator assembly 82 is not activated and in its retracted position, as shown in FIG. 3, an arm having a plurality of posts 94*a* moves from a retracted position to an extended position in which the posts 94*a* engage with a plurality of the studs 88 to prevent rotational movement of the driven plate 86. The locking actuator 84 is thus used to hold the rotating magazine 20 in a fixed position so that the ejector system 14 can be used to remove a part from a particular support element 20*a*.

FIGS. 3 and 4 illustrate the ejector system 14 in detail. Referring specifically to FIG. 3, the ejector system 14 includes a piston 100, an elongated spring 106 and an actuator 104. The actuator 104 is commercially available from SMC Pneumatics. The piston 100 preferably has a cavity that is sized and shaped to engaged with an end 106*a* of the spring 106. The spring 106 is preferably a length allowing it to extend from a point well inside the actuator 104, where it is coupled to a slide 104*a* of the actuator, to approximately the rear wall 17*b*. The spring 106 is supported slidably within a rigid length of guide tubing 108. The guide tubing 108 is coupled at its upper end 108*a* to an opening 104*a* in a wall of the actuator 104, and at its lower end 108*b* to the rear wall 17*b*. An aperture 105 in the rear wall 17*b* allows the spring 106 to be moved through the guide tube 108 into an aligned one of the support elements 20*a* of the magazine. In this regard, it will be appreciated that the end plate 72 includes apertures 72*b* aligned with each support element 20*a* to thus allow the spring 106 to extend thereinto during an eject cycle of operation. Each support element 20*a* includes a piston 100. The diameter of the piston 100 is slightly larger than the diameter of the apertures 72*a* so that the piston cannot slide through the aperture 72*b*.

The slide 104*a* is supported on a track 112 and moves bi-directionally, thus causing the spring 106 to be extended into and retracted from the support element 20*a*. The ejection system 14 is controlled by the controller 15 and causes the spring 106 to be extended into one of the support elements 20*a* during the eject cycle, thus causing the piston 100 to push the part supported within the support element 20*a* outwardly therefrom so that the part can be removed by an operator. A new part can then be placed within the support element 20*a* for heating once the spring 106 is retracted and the magazine 20 rotated by one position increment. The spring 106 is retracted by causing the controller 15 to transmit signals to the ejector system 14 via the operator foot pedal 19.

FIGS. 1, 8, 9 and 10 illustrate the controller 15. The controller 15 is preferably mounted adjacent to the oven 12 and can readily be mounted on either side of the oven 12 by suitable mounting brackets (not shown). The controller 15 controls rotation of the magazine 20, the air circulating system 16, the heating system 18 and the ejector system 14, as well as the operation of external cooling stations (not shown). The controller 15 includes a display 15*a* (FIG. 1) which comprises a cathode ray tube (CRT) touchscreen display. However, it will be appreciated that liquid crystal displays of any other suitable displays could also be employed.

Figure 8:
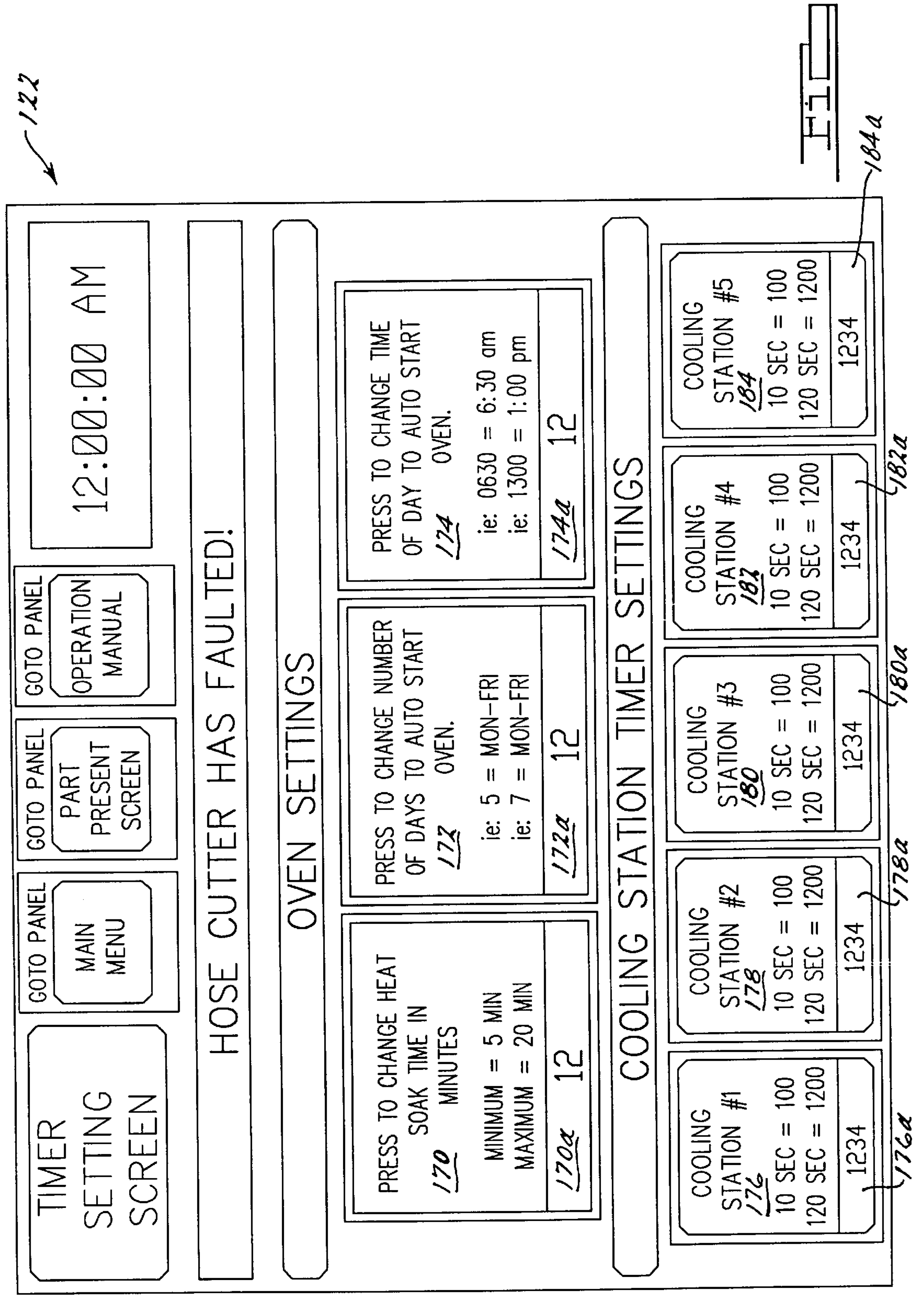
FIG. 8 is a view of the "Main Menu" screen displayed on the controller of the apparatus.

FIG. 8 illustrates a main menu 120 which is displayed on the display 15*a* of the controller 15. The features which are displayed on the main menu 120 include, but are not limited to, a plurality of status indicators and indexes. The status indicators include a selection 122 to go to a "Timer Setting" screen, a selection 124 to go to a "Part Present" screen, a selection 126 to go to an "Operation Manual" screen, and a selection 128 to go to a "Hose Cutter" screen.

An oven "Reset" selection 130 allows all the settings associated with operation of the oven to be reset. An indicator 130*a* indicates that the oven operational settings have been reset. A "Mode Select" selection 132 includes a selection 132*a* for selecting a "Rapid Loading" mode for enabling rapid loading of parts into the oven 12. A selection 132*b* allows the operator to select a "Rapid Unload" mode for rapidly ejection of all of the parts contained within the oven 12. Selection 132*c* allows the operator to select a "Run" mode of operation for enabling normal operation and heating of all of the parts presently within the support elements 20*a* of the magazine 20.

Indicator 134 provides a visual indication that the part disposed within the support element 20*a* at the input/output opening 40 is ready for removal. Indicator 136 informs the operator of the time remaining before the part disposed in the support element 20*a* currently at the input/output station 40 is ready to be ejected. Indicator 138 informs the operator that the temperature of the oven is at normal operating temperature (i.e., about 320° F.). Indicator 140 informs the user that the heating elements 62, 64 are not presently enabled. Message display 142 informs the operator of any failures in oven operation.

The main menu screen 120 also provides selections 144–150 which allow the operator to initiate operation of any one or more of a plurality of external cooling stations. The cooling stations are part holding components which direct a stream of cooling airflow over the part placed therein to expedite cooling of a part after the part has been formed into a desired shape. Displays 152–158 display the time remaining at each cooling station associated with selections 144–150.

The main menu screen 120 also provides a selection 160 for clearing a "shift" parts counter that keeps a running count of the number of parts in a given workshift processed by the apparatus 10. Pressing selection 160 clears the current count of parts and resets the shift parts counter to zero. Indicator 162 shows the number of parts produced during a given workshift, and is reset to zero when selection 160 is pressed.

Finally, the main menu 120 provides an indicator 164 which informs the operator of the time of day at which the controller 15 will turn on the heating elements 62, 64 of the oven 12 automatically. Indicator 166 indicates the number of days each week that the oven 12 is set to automatically start. This features allows the controller 15 to be set to start the oven 12 so that the oven is at its proper operating temperature when an operator arrives to begin a workshift. Display 168 provides the current time of day.

Referring to FIG. 9, the "Timer Setting" screen is shown in greater detail. The Timer Setting screen is selected via selection 122 in FIG. 8 and has a selection 170 that the operator presses to increment the heat soak time in one minute increments. Display 170*a* indicates the selected heat soak time. By "heat soak" time, it is meant that amount of time that any given part resides within the oven 12 before being presented at the input/output station 40 for removal. Selection 172 allows the operator to select the number of days per week, in one day increments, that the oven 12 is to automatically start. Display 172*a* displays the selected number of days. Selection 174 allows the user to select the time of day, in one minute increments, at which time the oven 12 is to be automatically started. Display 174*a* displays the time at which the apparatus 10 is to automatically turn on and begin operation of the heating elements 62, 64.

FIG. 9 also includes selections 176–184 for setting the "cooling" times at each of a plurality of independent, external cooling stations controlled by the controller 15. For example, pressing selection 176 brings up a keypad (not shown) on this screen which allows the operator to select the desired cooling time in one second increments. The current cooling time for each station is indicated by displays 176*a*–184*a*.

Figure 10:
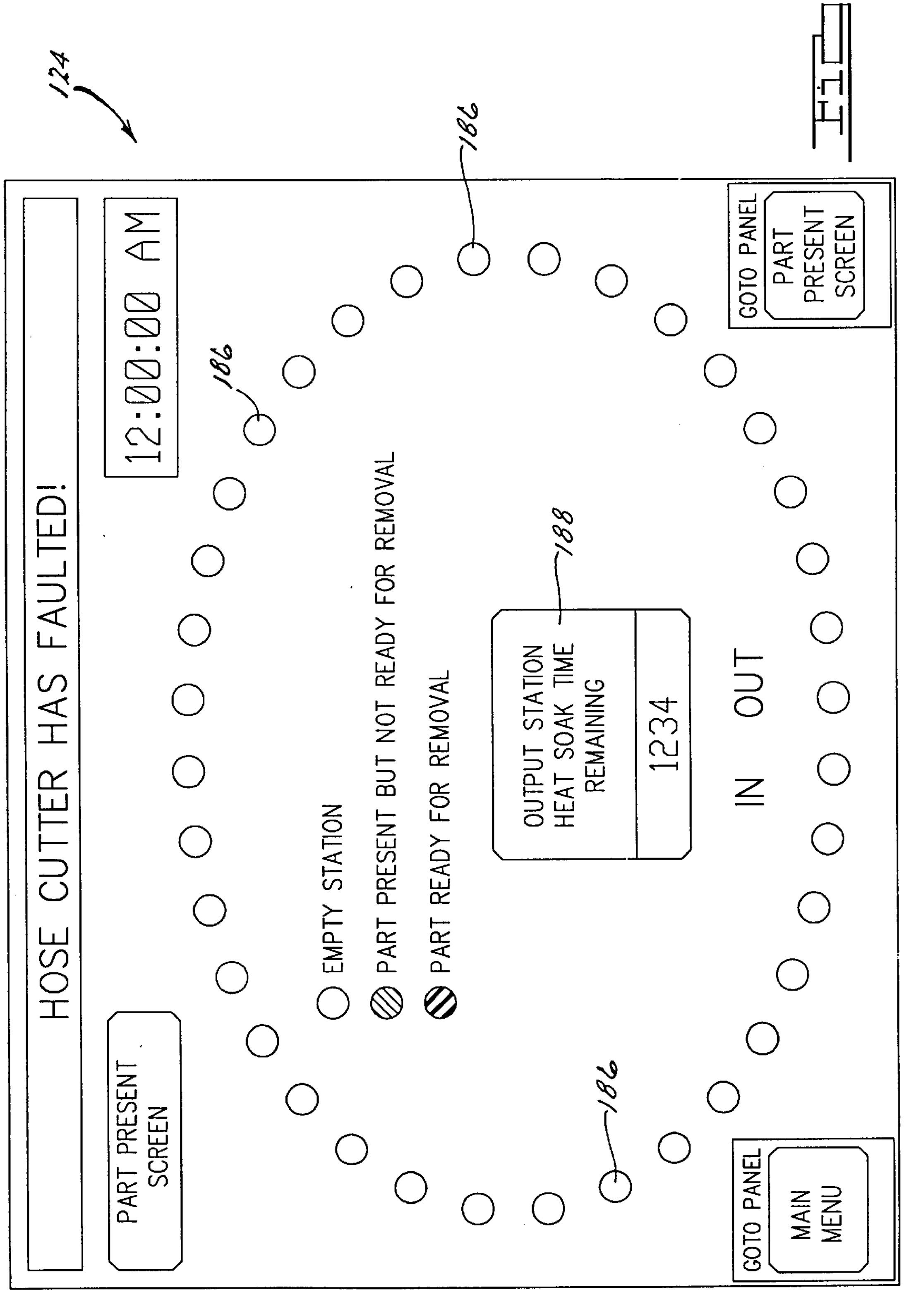
FIG. 10 is a view of the "Clock Set" screen displayed by the controller.

FIG. 10 illustrates the "Part Present" screen which is selected via selection 124 in FIG. 8. This screen presents the operator with a quick, convenient visual representation of which part stations (i.e., support elements 20*a*) are empty, which have parts loaded but which are not yet ready for removal, and which have parts loaded which are ready for removal. This is done by indicators 186 which present a color coded representation indicating the above information. If a part is present but not ready for removal, its associated indicator will be red. If a part is present and ready for removal, its associated indicator 186 will be green. If no part is present in a support element 20*a*, its associated indicator 186 will be black. Of course, it will be appreciated that other colors or coded representations could also be employed. A display 188 informs the user of the amount of time remaining before the part presently at the input/output station 40 can be removed.

Figure 11:
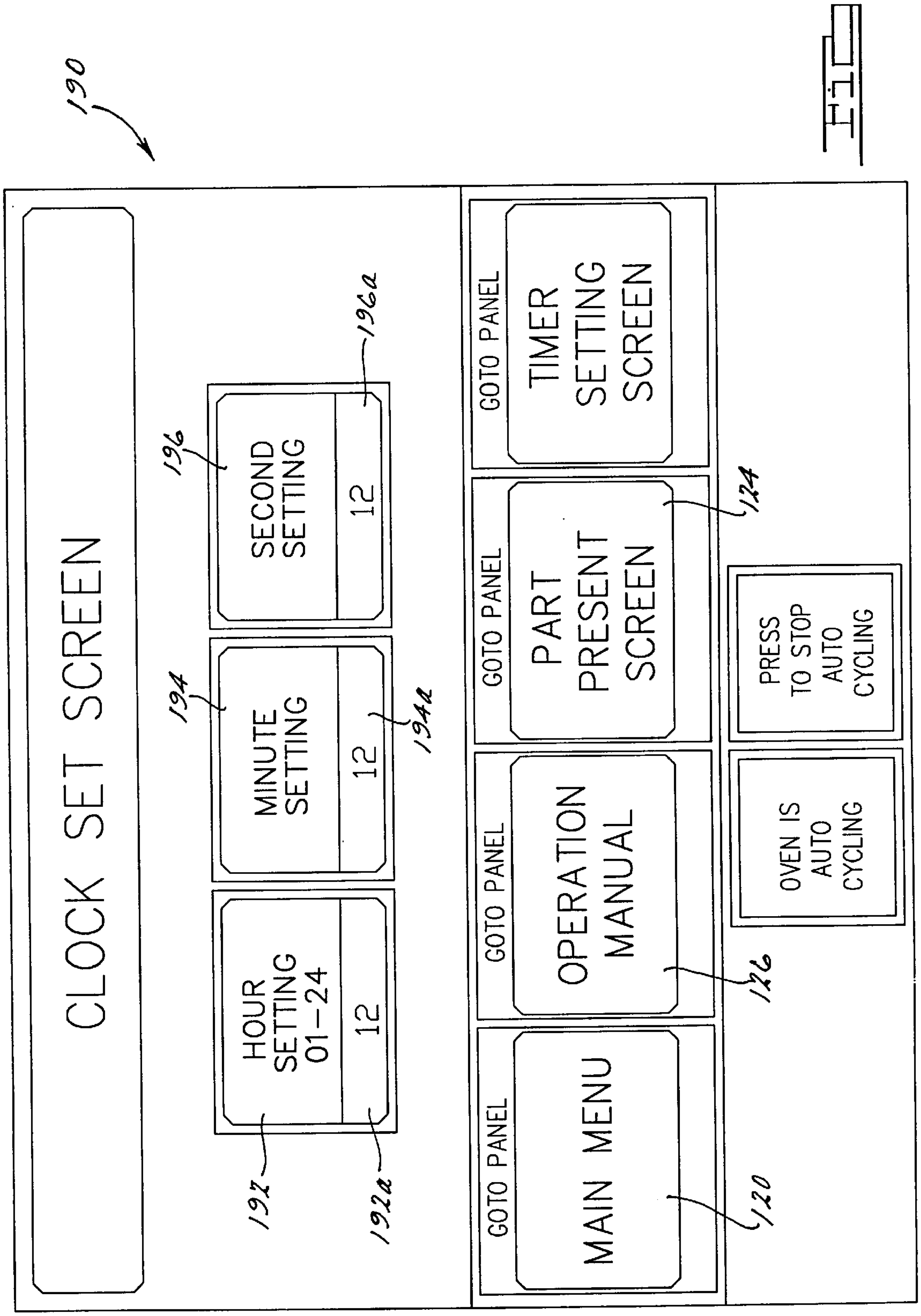
FIG. 11 is a view of a "Part Present" screen displayed by the controller.

Referring to FIG. 11, a "Clock Set" screen 190 is provided for allowing the operator to change the time of the system clock in the controller 15. Selection 192 allows the operator to bring up a keypad at which the operator can select the hour, in one hour increments. Display 192*a* informs the user of the presently selected hour. Pressing selection 194 brings up a keypad which allows the operator to input the minute, in one minute increments. Display 194*a* informs the user of the presently selected minutes. Pressing selection 196 brings up a keypad which allows the operator to set the seconds for the controller 15 clock. Display 196*a* informs the operator of the presently selected number of seconds.

With each of the above-described menu screens, options are provided to return to other screens. Also, the main menu screen 120 and the "Part Present" screen 124 each preferably provide a message display to immediately inform the operator that an oven failure has occurred.

Indicator 198 informs the operator that the system is in an "Auto Cycling" mode during testing, wherein the oven 12 is operated continuously for a prolonged period of time before being released for shipment to a customer. Selection 200 allows an engineer or technician to terminate the "Auto Cycling" mode.

The operation of the system includes start up, set up and running. To power up the apparatus 10, the ON/OFF switch 15*b* (FIG. 1) is switched to the "On" position. At this point power will be applied to an external temperature controller (not shown), and to the controller 15. The external temperature controller preferably includes controls for allowing an operator to set the oven 12 temperature, as well as a display for displaying the current temperature of the oven 12. The main air flow fans 51*a* and 53*a* are always on. The apparatus 10, if left on during the night, can automatically start applying power to the heating elements 62, 64 at a pre-programmed start time and day. Resetting the apparatus 10 via reset selection 130*a* (FIG. 8) will also cause power to be applied to the heating elements 62, 64.

To set timers for the external cooling stations the operator uses the "Timer Setting" screen 122 to input the desired cooling time for each cooling station. If the temperature controlled heating apparatus was left on overnight, it will have started to warm up on its own at the programmed start time. If the apparatus 10 was just turned on, pressing "Reset" selection 130 (FIG. 8) will cause the oven 12 to start warming up.

The "Run" mode is selected by pressing selection 132*c* and then "Reset" is pressed to enable the selected mode. The oven 12 will continue to warm until it reaches a set temperature. In the "Rapid Load" mode selected via selection 132 (FIG. 8), once the set temperature is reached, then the operator can begin loading parts. At any time the apparatus 10 can be put in the "Rapid Unload" mode (selection 132 in FIG. 8) to remove parts from the apparatus.

To implement the "Rapid Load" mode the mode select selection 132 is pressed until the "Rapid Load" mode is illuminated. The "Reset" selection 130 is then pressed. Next the operator presses the foot pedal 19 and holds it depressed to hold the door 26 in the open position. A part is then loaded through the input/output port 40 and the foot pedal 19 is released. The magazine 20 will be advanced (i.e., rotated) one position and the above-described procedure is then repeated until all of the parts have been loaded or the magazine 20 is full.

To implement the "Rapid Unload" mode, the mode select selection 132 is pressed until the "Rapid Unload" option 132*b* is illuminated, and then the "Reset" selection 130 is pressed. The operator then presses and holds the foot pedal 19 and the part at the input/output station 40 is presented to the operator for removal. After withdrawing the part, the operator releases the foot pedal 19 and the magazine 20 is advanced to the next position and the operator again presses the foot pedal 19 to repeat the procedure.

When the apparatus 10 is to be put in the "Run" mode, the oven 12 must first be loaded with parts. The "Run" mode option 132c (FIG. 8) is selected and the "Reset" selection 130 is pressed. When the "Part Ready" indicator is illuminated green, the operator can press and release the foot pedal 19. This causes the door 26 to open to allow the operator to load a new part into the magazine 20. After the part is loaded, the operator again presses the foot pedal 19 to signal the oven 12 to eject the part that was ready for removal when the ejected part is fully presented to the operator, the part is removed and the foot pedal 19 is released. The magazine 20 will advance one position and the procedure is then repeated.

The present invention thus provides an oven which operates to more quickly and efficiently heat parts than other types of ovens which rely strictly on radiant heat from fixedly mounted heating elements. The constant, forced circulation of heated air around each of the support elements 20*a* of the magazine 20 significantly expedites heating of the parts held with the support elements 20*a*. The more rapid heating reduces the costs associated with operation of the oven, since parts are heated to the desired temperature in less time than with other forms of ovens.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims:

What is claimed is:

1. A heating apparatus for heating a plurality of parts located within the apparatus, said apparatus comprising:

an oven having a housing;

a heating system for heating said parts within the housing;

an airflow generating system for circulating heated air within said housing of said oven, said airflow generating system including a manifold comprising at least one outlet to exhaust said heated air; and a magazine for supporting a plurality of parts within said housing and rotating said parts within said housing so that said parts are more quickly and efficiently heated said manifold of said air circulation system including a tubular component extending within the interior area of said magazine for assisting in circulating airflow around said magazine.

2. The apparatus of claim 1, wherein said airflow generating system includes:

at least one elongated tube for drawing said heated air near a bottom area of said housing and directing said heated air toward an upper end of said housing; and at least one fan operably associated with said elongated tube for drawing said heated air into and through said elongated tube.

3. The apparatus of claim 2, wherein said airflow generating system includes a manifold operably coupled to said elongated tube and said fan, for directing said heated air drawn up through said tube outwardly into said oven in a swirling vortex motion.

4. The apparatus of claim 1, wherein said heating system comprises a pair of electric heating elements.

5. The apparatus of claim 1, further comprising a controller for controlling operation of said apparatus.

6. The apparatus of claim 5, further comprising a user actuatable switch in communication with said controller for controlling loading of said parts into said oven.

7. The apparatus of claim 5, further comprising a foot pedal operated switch in communication with said controller for signaling said controller that a part is to be loaded into or unloaded from said apparatus.

8. The apparatus of claim 1, wherein said magazine comprises a plurality of part supporting elements adapted to receive a plurality of said parts, and to support said plurality of said parts within said housing.

9. The apparatus of claim 1, further comprising an ejector system operably associated with said magazine for ejecting parts out of said magazine.

10. A heating apparatus for heating a plurality of parts, said apparatus comprising:

an oven having a housing, said housing including an interior area and an input/output station;

a heating system disposed within said interior area of said housing;

an air circulating system for circulating heated air within said housing, said air circulation system including a manifold comprising at least one outlet to exhaust said heated air;

a magazine for supporting a plurality of said parts, said magazine being mounted for rotational movement within said housing and in relation to said input/output station such that said parts can be loaded into said magazine and unloaded therefrom one at a time through said input/output station;

said heating system including at least one heating element extending within an interior area defined by said magazine;

a controller for controlling operation of said magazine and informing an operator when each said part has been heated sufficiently to be removed from said oven; and said manifold of said air circulation system including a tubular component extending within said interior area of said magazine for assisting in circulating airflow around said magazine.

11. The apparatus of claim 10, further comprising a temperature sensing probe disposed within said oven in communication with said controller.

12. The apparatus of claim 10, further comprising a user actuatable device in communication with said controller for assisting in controlling loading and unloading of said parts from said oven.

13. The apparatus of claim 10, further comprising an actuator system operably associated with said magazine and said controller for causing rotation of said magazine to thus present each one of said plurality of parts at said input/output station when said parts are ready for removal from said oven.

14. The apparatus of claim 13, wherein said actuator system comprises a locking actuator for holding said magazine stationary within said oven.

15. The apparatus of claim 13, further comprising an ejection system operably associated with said controller and said magazine for ejecting said parts from said magazine.

16. A heating apparatus for heating a plurality of parts, said apparatus comprising:

an oven having a housing, said housing including an interior area and an input/output station;

a heating system including a heating element disposed within said interior area of said housing;

an air circulating system for circulating heated air within said housing to promote rapid heating of said parts disposed within said oven, said air circulating system including a manifold comprising at least one outlet to exhaust said heated air;

a magazine having a plurality of support elements for supporting a plurality of said parts, said magazine being mounted for rotational movement within said housing and in relation to said input/output station such that said parts can be loaded into said magazine and unloaded therefrom one at a time through said input/output station;

said heating element being disposed within an interior area defined by said magazine;

and said manifold further having a tubular component extending longitudinally within said magazine along an axis of rotation of said magazine for assisting in recirculating heated air within said oven;

a controller for controlling operation of said magazine and informing an operator when each said part has been heated sufficiently to be removed from said oven; and an ejection system responsive to said controller and operably associated with said magazine for ejecting said parts from said support elements of said magazine through said input/output station when said parts are sufficiently heated so as to be ready for removal from said oven.

17. The apparatus of claim 16, wherein said apparatus includes a temperature sensing probe for sensing the temperature in said interior area of said oven and generating a corresponding temperature signal to said controller.

18. The apparatus of claim 16, further comprising a user actuatable switch in communication with said controller for assisting in controlling positioning of said magazine relative to said input/output station during loading and unloading of said parts from said magazine.

* * * * *